(No Model.)
J. B. PELTON.
GRAIN ELEVATOR.
No. 274,817. Patented Mar. 27, 1883.
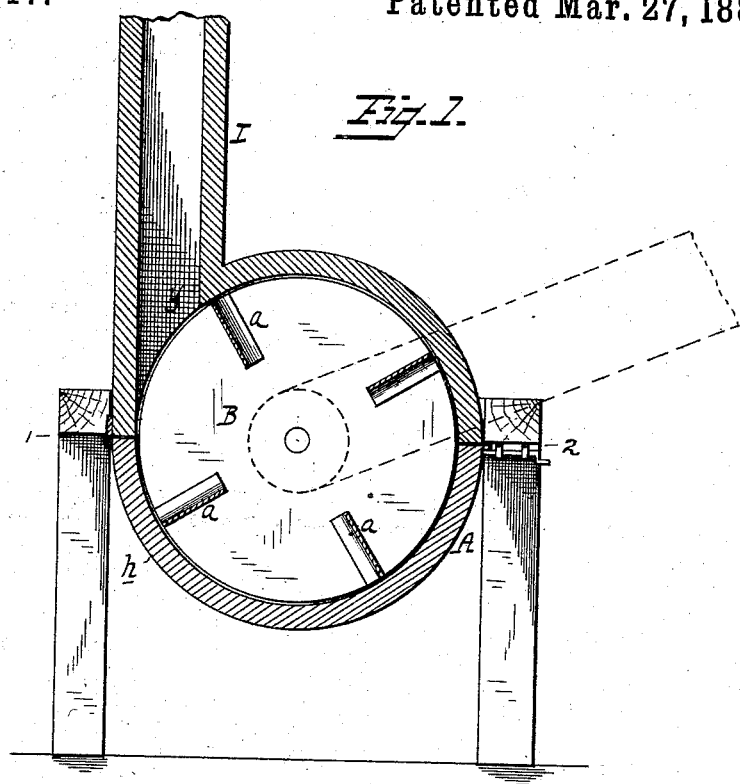
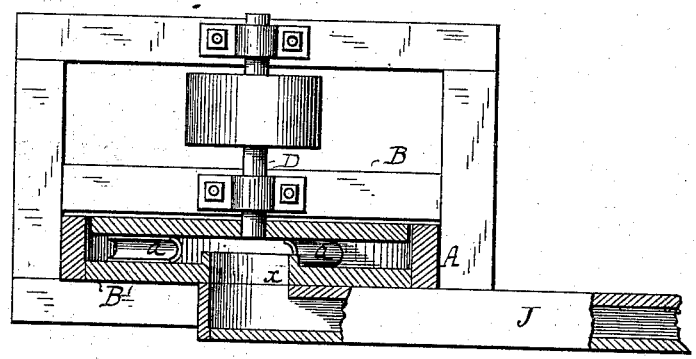
Witnesses:
A. E. Hausmann
William Paton
Jas. B. Pelton
Inventor
By Charles E. Foster
Attorney.

UNITED STATES PATENT OFFICE.

JAMES B. PELTON, OF FREDERICK COUNTY, MARYLAND, ASSIGNOR OF ONE-HALF TO DAWSON E. HAMMOND, OF SAME PLACE.

GRAIN-ELEVATOR.

SPECIFICATION forming part of Letters Patent No. 274,817, dated March 27, 1883.

Application filed February 13, 1883. (No model.)

*To all whom it may concern:*

Be it known that I, JAMES B. PELTON, a citizen of the United States, and a resident of Frederick county, in the State of Maryland, have invented certain new and useful Improvements in Grain-Elevators, of which the following is a specification.

The object of my invention is to move grain and other comminuted substances, and for this purpose I employ peculiar but simple appliances, hereinafter described, which act upon the grain by impact, and thereby propel it the required distance.

In the drawings, Figure 1 is a sectional elevation of my improved apparatus. Fig. 2 is a section on the line 1 2, Fig. 1.

A is a cylindrical case, arranged vertically and suitably supported, and open at one side, receiving a disk, B, which closes said side of the case, and is mounted upon a shaft, D, to which a rapid rotation sufficient to expel the grain by impact is imparted. The disk carries upon its inner face a series of beaters, $a$, each of which may be preferably curved transversely, as shown in Fig. 2, but may be straight, corrugated, or of other form. In the outer side, B', of the case is a central opening, $x$, to which the grain or other material is fed toward the face of the disk B, the particles, as they fall toward to the bottom of the case, being struck by the rapidly-moving blades $a$, and carried by centrifugal action toward the periphery of the case, and finally escaping through an opening, $y$, in the rim, which opening communicates with a tangential uptake or chute, I. As the blades $a$ do not extend to the center of the disk B, the material is not brought immediately in contact with said blades on entering the case, but falls to a certain extent toward the periphery, so that it will not be brought in contact with the blades until it reaches a point where the latter are moving at an extremely rapid rate, being thereby subjected to such sudden impact that it will be carried to a great distance as soon as it reaches the opening $y$.

The inlet-chute J may project into the case, as shown, so that the grain will fall into the center, and not to one side between the blades and the side of the case.

The blades $a$ are of such size as to be merely sufficient to strike and propel the grains as they fall into the case and expel the same without carrying them past the exit-opening, and are distinguished in this respect from the blades in that class of machines in which such blades serve as a means of propelling air to create a blast which carries the grain upward and from those which merely push the grain.

The substitution of impact for a blast renders a large and expensive blowing apparatus and corresponding driving mechanism unnecessary, while heavy particles which could not be raised by a blast can be moved with facility.

It will be apparent that the chute I may be inclined, or vertical, or horizontal, as may be necessary.

In order to facilitate access to the interior of the apparatus, the lower section, $h$, of the rim may be hinged to or detachable from the case.

I do not limit myself to the precise construction of parts shown, as other arrangements may be employed to bring the particles in contact with rapidly-moving blades, which project them to the required distance. For instance, there may be two parallel rotating disks with blades extending between them.

I claim—

1. The within-described improvements in moving grain or other comminuted materials, the same consisting in feeding the grain toward rapidly-moving blades, by which it is projected to the required extent, substantially as set forth.

2. The combination, in an apparatus for moving grain, of a revolving disk, B, carrying radial blades $a$, arranged near the periphery, a feeding-opening opposite the center of the disk, and a tangential chute, substantially as set forth.

3. The combination, with the case A, open at one side, having a feeding-opening in the other, and communicating with the delivery-chute, of a disk, B, carrying blades $a$, and revolving within the open side of the case, substantially as set forth.

4. The combination of the disk B, carrying blades $a$, and the case A, communicating with the chute I, and provided with a movable rim-section, $h$, substantially as set forth.

In testimony whereof I have signed my name to this specification in the presence of two subscribing witnesses.

JAMES B. PELTON.

Witnesses:
W. R. JOHNSON,
R. P. JOHNSON.